(12) United States Patent
Xu

(10) Patent No.: US 12,424,214 B2
(45) Date of Patent: Sep. 23, 2025

(54) SPEECH INTERACTION METHOD, APPARATUS, AND SYSTEM

(71) Applicant: Huawei Technologies Co., Ltd., Shenzhen (CN)

(72) Inventor: Wenhua Xu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 590 days.

(21) Appl. No.: 17/619,055

(22) PCT Filed: Jun. 12, 2020

(86) PCT No.: PCT/CN2020/095847
§ 371 (c)(1),
(2) Date: Dec. 14, 2021

(87) PCT Pub. No.: WO2020/249091
PCT Pub. Date: Dec. 17, 2020

(65) Prior Publication Data
US 2022/0358919 A1 Nov. 10, 2022

(30) Foreign Application Priority Data
Jun. 14, 2019 (CN) .......................... 201910517380.9

(51) Int. Cl.
*G10L 15/22* (2006.01)
*G10L 15/24* (2013.01)
(52) U.S. Cl.
CPC .............. *G10L 15/22* (2013.01); *G10L 15/24* (2013.01); *G10L 2015/223* (2013.01)
(58) Field of Classification Search
CPC ... G10L 15/22; G10L 15/24; G10L 2015/223; G06F 3/167
See application file for complete search history.

(56) References Cited

U.S. PATENT DOCUMENTS 10,089,983 B1 * 10/2018 Gella ...................... G10L 15/22
10,602,268 B1 * 3/2020 Soto ........................ G10L 25/84
(Continued)

FOREIGN PATENT DOCUMENTS

CN 108170792 A 6/2018
CN 108664472 A 10/2018
(Continued)

OTHER PUBLICATIONS

Wen, W., et al., "Perceived voice and turnover intention: The mediating roles of two different affective commitments," International Conference on Management Science and Engineering 21th Annual Conference Proceedings, 2014, 14 pages.
(Continued)

*Primary Examiner* — Mark Villena
(74) *Attorney, Agent, or Firm* — Conley Rose, P.C.

(57) ABSTRACT

A speech interaction method includes receiving, by a server, a first play message, where the first play message includes an identifier of first audio content corresponding to a first non-speech instruction. The server determines a first intent and first slot information that correspond to the first non-speech instruction. In response to the first play message, the server instructs a playback device to play the first audio content. The server receives a first speech instruction input by a user into the playback device, where a second intent or second slot information or both in the first speech instruction are incomplete. The server determines, based on the first intent and the first slot information, the second intent and the second slot information that correspond to the first speech instruction, and the server, based on the second intent and the second slot information, instructs the playback device to play second audio content.

20 Claims, 8 Drawing Sheets

(56) References Cited

U.S. PATENT DOCUMENTS

| | | | |
|---|---|---|---|
| 11,176,934 B1* | 11/2021 | Venkatesh Raman | ....................... G10L 15/32 |
| 2003/0023435 A1* | 1/2003 | Josephson | ............... G10L 15/26 704/E15.044 |
| 2007/0208556 A1 | 9/2007 | Kwak et al. | |
| 2008/0091406 A1* | 4/2008 | Baldwin | ................. G06F 3/167 704/4 |
| 2008/0104112 A1 | 5/2008 | Nicholl et al. | |
| 2016/0098988 A1* | 4/2016 | Goussard | ............ G10L 15/1822 704/257 |
| 2017/0160813 A1* | 6/2017 | Divakaran | ............. G06N 3/006 |
| 2018/0108351 A1 | 4/2018 | Beckhardt et al. | |
| 2018/0233139 A1* | 8/2018 | Finkelstein | ...... H04N 21/44218 |
| 2018/0314689 A1* | 11/2018 | Wang | .................. G10L 15/1822 |
| 2018/0359349 A1* | 12/2018 | Graylin | ............... G10L 15/1815 |
| 2020/0105260 A1* | 4/2020 | Piernot | ............... G10L 15/1815 |
| 2020/0225908 A1* | 7/2020 | Lee | ......................... G06F 3/167 |
| 2020/0258509 A1* | 8/2020 | Bharadwaj | .......... G06F 16/9535 |

FOREIGN PATENT DOCUMENTS

| | | |
|---|---|---|
| CN | 108877796 A | 11/2018 |
| CN | 108880961 A | 11/2018 |
| CN | 108899036 A | 11/2018 |
| CN | 108922531 A | 11/2018 |
| CN | 109101545 A | 12/2018 |
| CN | 109545206 A | 3/2019 |
| CN | 109754809 A | 5/2019 |
| CN | 109800407 A | 5/2019 |
| CN | 110413250 A | 11/2019 |

OTHER PUBLICATIONS

Wei, Q., "Voice-based Human-computer Interaction Platform Design and Implementation," Huazhong University of Science and Technology, 2019, 2 pages (abstract).

\* cited by examiner

SPEECH INTERACTION METHOD, APPARATUS, AND SYSTEM

CROSS-REFERENCE TO RELATED APPLICATIONS

This application is a U.S. National Stage of International Patent Application No. PCT/CN2020/095847, filed on Jun. 12, 2020, which claims priority to Chinese Patent Application No. 201910517380.9, filed on Jun. 14, 2019. Both of the aforementioned applications are hereby incorporated by reference in their entireties.

TECHNICAL FIELD

This application relates to the field of terminal technologies, and in particular, to a speech interaction method, apparatus, and system.

BACKGROUND

With the development of speech recognition technologies, voice assistants (such as Siri, Xiao Ai, and Celia) are added to many electronic devices to help users complete human-computer interaction with the electronic devices. Take a voice assistant, Siri, as an example. After a user wakes up Siri in a mobile phone or a speaker, Siri may perform speech communication with the user. During the speech communication. Siri can reply to or execute every speech instruction sent by the user.

Usually, the voice assistant has a speech connection function when performing speech interaction with the user. For example, after waking up the voice assistant in the speaker, the user may input a first speech instruction "play Jay Chou's Nunchakus" into the voice assistant. After interacting with a server, the voice assistant may extract an intent (intent) and a slot (slot) from the first speech instruction. For example, the intent in the first speech instruction is to play a song, and the first speech instruction includes two slots: a performer and a name of the song. The performer is Jay Chou and the name of the song is Nunchakus. Further, the voice assistant may obtain an audio resource corresponding to the intent and the slots from the server, and play the audio resource through the speaker.

In a playing process, if the voice assistant receives a second speech instruction "a live version" input by the user, the voice assistant may request the server to extract an intent and slots from the second speech instruction based on the intent and the slots in the previous speech instruction (namely, the first speech instruction). For example, the server may determine, based on the intent and the slots in the first speech instruction, that the user adds a slot of version information to the second speech instruction. In this case, the server may determine that the intent in the second speech instruction is also to play a song, two slots, namely, a performer and a name of the song, in the second speech instruction are the same as those in the first speech instruction, and a third slot (namely, the version information) in the second speech instruction is the live version. Further, the server may send an audio resource corresponding to the intent and the slots in the second speech instruction to the speaker for playing.

However, in some scenarios, the user may interact with the speaker in another manner in addition to using a speech instruction. For example, the user may install an APP on the mobile phone to control the speaker. When the user uses the APP to control the speaker to play Jay Chou's Nunchakus, if the speaker receives the second speech instruction "a live version" input by the user, the speaker cannot accurately identify a specific intent or a specific slot in the second speech instruction because an intent and a slot similar to those in the first speech instruction are not stored in the server. As a result, the speaker cannot respond to the second speech instruction input by the user. This reduces user experience when the user performs speech interaction with a device.

SUMMARY

This application provides a speech interaction method, apparatus, and system. In this case, when another interaction manner is used during speech interaction between a user and an electronic device, the electronic device may still extract an intent and a slot in a speech instruction, which improves accuracy of responding to the speech instruction by the electronic device, and improves user experience.

To achieve the foregoing objective, the following technical solutions are used in this application.

According to a first aspect, this application provides a speech interaction method. The method includes: A server receives a first play message, where the first play message includes an identifier of first audio content, and the first play message is usually generated in response to a first non-speech instruction input into a playback device (for example, a speaker) by a user; the server may determine, based on the identifier of the first audio content, a first intent and first slot information that correspond to the first non-speech instruction; in response to the first play message, the server may indicate the playback device to play the first audio content; after the playback device starts to play the first audio content, the server may receive a first speech instruction input into the playback device by the user, and when a second intent or second slot information or both in the first speech instruction are incomplete, the server may determine, based on the first intent and the first slot information, the second intent and the second slot information that correspond to the first speech instruction; and further, the server may indicate, based on the second intent and the second slot information, the playback device to play second audio content.

In other words, when the user inputs the first non-speech instruction to the playback device in a non-speech instruction manner, the server can still extract the first intent and the first slot information that correspond to the first non-speech instruction. In this way, when the server subsequently receives the first speech instruction whose intent or slot information is incomplete, the server may accurately determine, based on the first intent and the first slot information in a context, the second intent and the second slot information that correspond to the first speech instruction, so that the playback device can still accurately respond to a speech instruction of the user in a speech interaction scenario in which another interaction manner is used, to enable the user to have better speech interaction experience.

In a possible implementation, the server may preset one or more items of details of audio content as a slot field, and preset one or more items of the details as an intent field. That the server determines, based on the identifier of the first audio content, the first intent and the first slot information that correspond to the first non-speech instruction includes: The server extracts, based on the identifier of the first audio content, the first intent from an intent field corresponding to the first audio content; and the server extracts, based on the identifier of the first audio content, the first slot information from a slot field corresponding to the first audio content.

In a possible implementation, after the server determines, based on the identifier of the first audio content, the first intent and the first slot information that correspond to the first non-speech instruction, the method further includes: The server saves the first intent and the first slot information as a context. In this case, that the server determines, based on the first intent and the first slot information, the second intent and the second slot information that correspond to the first speech instruction includes: The server determines, based on the intent and the slot information stored in the context, the second intent and the second slot information that correspond to the first speech instruction.

In a possible implementation, after the server determines, based on the first intent and the first slot information, the second intent and the second slot information that correspond to the first speech instruction, the method further includes: The server saves the second intent and the second slot information as the context. In other words, the server stores an intent and slot information that are extracted last time, to provide a basis for determining an intent and slot information in a subsequent speech instruction.

In a possible implementation, that the server saves the first intent and the first slot information as the context includes: If the first play message carries a preset identifier, which indicates that the first non-speech instruction is actively triggered by the user, the server saves the first intent and the first slot information as a first context; or if the first play message does not carry the preset identifier, which indicates that the first non-speech instruction is not actively triggered by the user, the server saves the first intent and the first slot information as a second context, where a priority of the second context is lower than a priority of the first context. When the first play message does not carry the preset identifier, the first play message may further carry another preset identifier used to indicate that the first non-speech instruction is not actively triggered by the user.

In addition, when saving the first context, the server may further set an effective time of the first context. Similarly, when saving the second context, the server may further set an effective time of the second context.

In a possible implementation, the server stores the first context and the second context. That the server determines, based on the intent and the slot information stored in the context, the second intent and the second slot information that correspond to the first speech instruction includes: If effective duration of the second context is less than a first preset value, which indicates that the first speech instruction of the user is probably for audio content corresponding to the first context, the server determines, based on the intent and the slot information in the first context, the second intent and the second slot information that correspond to the first speech instruction; or if the effective duration of the second context is greater than a second preset value, which indicates that the first speech instruction of the user is probably for audio content corresponding to the second context, the server determines, based on the intent and the slot information in the second context, the second intent and the second slot information that correspond to the first speech instruction, where the second preset value is greater than or equal to the first preset value.

Alternatively, if the effective duration of the second context falls within a range between the first preset value and the second preset value, the server may generate an intent and slot information of the first speech instruction based on the first context, and generate an intent and slot information of the first speech instruction based on the second context. Further, the server may score confidence levels of the foregoing two intents and the foregoing two pieces of slot information according to a preset policy. If scores of the intent and the slot information generated based on the first context are higher, the server may determine the second intent and the second slot information of the first speech instruction based on the intent and the slot information in the first context. If scores of the intent and the slot information generated based on the second context are higher, the server may determine the second intent and the second slot information of the first speech instruction based on the intent and the slot information in the second context.

In a possible implementation, the first speech instruction includes the second slot information but does not include the second intent; and that the server determines, based on the first intent and the first slot information, the second intent and the second slot information that correspond to the first speech instruction includes: If the first intent is a preset inheritable intent, the server determines that the second intent is the same as the first intent.

In a possible implementation, the first speech instruction includes the second intent but does not include the second slot information; and that the server determines, based on the first intent and the first slot information, the second intent and the second slot information that correspond to the first speech instruction includes: If the first slot information is preset inheritable slot information, the server determines that the second slot information is the same as the first slot information.

In a possible implementation, that the server indicates, based on the second intent and the second slot information, the playback device to play the second audio content includes: The server sends a second play instruction to the playback device, where the second play instruction includes an audio resource of the second audio content, for example, a URL of the second audio content, corresponding to the second intent and the second slot information.

In a possible implementation, the first non-speech instruction may be a non-speech instruction input into the playback device by the user (for example, an operation performed on a speaker touchscreen), an instruction for the playback device to automatically switch audio content (for example, an instruction for the speaker to automatically switch to a next song), a non-speech instruction input into another electronic device by the user (for example, an on-demand operation input by the user by using a speaker APP on a mobile phone), or an instruction for the another electronic device to automatically switch audio content in the playback device (for example, an instruction for the speaker APP to automatically control the speaker to play the next song).

According to a second aspect, this application provides a speech interaction system including a server and a playback device. The server is configured to receive a first play message, the first play message includes an identifier of first audio content, and the first play message is generated in response to a first non-speech instruction input into the playback device by a user.

In a possible implementation, the first play message further includes details of the first audio content, and the details include one or more of a performer, a name, an audio type, or a version type.

In a possible implementation, the system further includes a terminal installed with a preset application, and the preset application is configured to control the playback device. For example, the preset application may be a speaker APP. The terminal may be configured to send the first play message to the server; or the terminal may be configured to send the first play message to the server by using the playback device. In other words, after the user inputs the first non-speech instruction into a speaker by using the speaker APP, the terminal may send the first play message to the server; or the terminal may send the first play message to the speaker, and then the speaker sends the first play message to the server.

In a possible implementation, the server is configured to: determine, after receiving the first play message, a first intent and first slot information that correspond to the first non-speech instruction; or determine, after receiving a first speech instruction input into the playback device by the user, a first intent and first slot information that correspond to the first non-speech instruction. In other words, after receiving the first play message, the server may extract the first intent and the first slot information that correspond to the first non-speech instruction, and save the first intent and the first slot information as a context; or after receiving the first speech instruction whose intent or slot is incomplete, the server may extract the first intent and the first slot information that correspond to the first non-speech instruction, and save the first intent and the first slot information as the context.

According to a third aspect, this application provides a server including a processor, a memory, a communications module, and one or more computer programs. The processor is coupled to both the communications module and the memory. The one or more computer programs are stored in the memory. When the server runs, the processor executes the one or more computer programs stored in the memory, to enable the server to perform the speech interaction method according to any one of the implementations of the first aspect.

According to a fourth aspect, this application provides a computer storage medium including computer instructions. When the computer instructions are run on a server, the server is enabled to perform the speech interaction method according to any one of the implementations of the first aspect.

According to a fifth aspect, this application provides a computer program product. When the computer program product runs on a server, the server is enabled to perform the speech interaction method according to any one of the implementations of the first aspect.

It may be understood that, the electronic device in the third aspect, the computer storage medium in the fourth aspect, and the computer program product in the fifth aspect that are provided above are all configured to perform the corresponding method provided above. Therefore, for beneficial effects that can be achieved by the electronic device, the computer storage medium, and the computer program product, refer to beneficial effects in the corresponding method provided above. Details are not described again herein.

DESCRIPTION OF EMBODIMENTS

For ease of understanding the following embodiments clearly, related terms in a speech recognition technology are briefly described first.

Intent (intent): Each speech instruction input by a user corresponds to an intent of the user. An intent is an expression or a collection of more expressions. For example, "I want to see a movie" and "I want to see Andy Lau's action movie produced in 2001" may belong to a same intent of playing a video.

Slot information: Slot information refers to key information in a speech instruction input by a user to express an intent. The slot information directly determines whether an electronic device (or a server) can match a correct intent. A slot corresponds to keywords of a same type, and information in the slot (namely, slot information) may be filled with the keywords of the same type. For example, a query sentence corresponding to an intent of playing a song may be "I want to listen to a {song} of a {singer}". The {singer} is a slot for a singer, and the {song} is a slot for a song. In this case, if the electronic device (or the server) receives a speech instruction "I want to listen to Faye Wong's Red Bean" input by the user, the electronic device (or the server) may extract slot information Faye Wong in the slot {singer}, and slot information Red Bean in the slot {song} from the speech instruction. In this way, the electronic device (or the server) may identify, based on the two pieces of slot information, that a user intent of the current speech input is to play Faye Wong's song Red Bean.

When the user performs speech interaction with the electronic device, each time after receiving a speech instruction input by the user, the electronic device may extract, by interacting with the server, an intent and slot information that correspond to the current speech instruction, and further execute an operation instruction corresponding to the current intent and the current slot information. In this way, a response to the current speech instruction input by the user is completed.

The following describes implementations of the embodiments of this application in detail with reference to the accompanying drawings.

Figure 1:
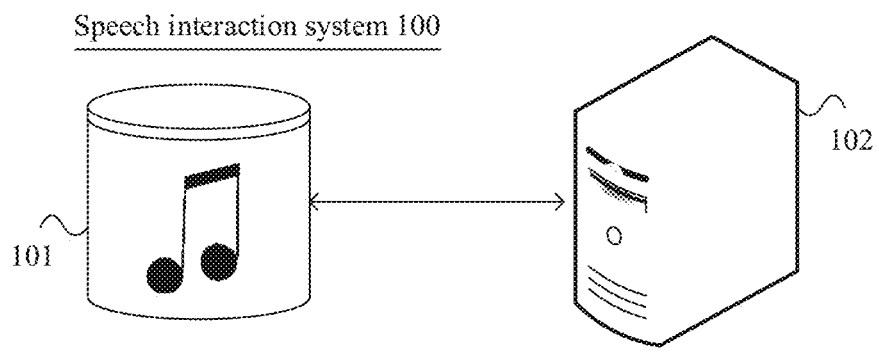
FIG. 1 is a schematic diagram 1 of a structure of a speech interaction system according to an embodiment of this application.

For example, a speech interaction method provided in an embodiment of this application may be applied to a speech interaction system 100 shown in FIG. 1. The speech interaction system 100 may include at least one electronic device 101 and at least one server 102.

The electronic device 101 may be a playback device having an audio playback function. For example, the electronic device 101 is a speaker. The speaker may receive a speech instruction input by a user. For example, the user may wake up a voice assistant in the speaker by inputting a preset wakeup phrase (for example, "Hello Celia", "Celia", and "Hi Siri"). After being woken up, the voice assistant may receive a speech instruction input by the user. Further, the speaker may send the received speech instruction to the server 102. For example, the speaker may convert the received speech instruction into text information and send the text information to the server 102, or the speaker may directly send the received speech instruction to the server 102.

After receiving the speech instruction sent by the speaker, the server 102 may extract an intent and slot information in the current speech instruction by using a preset natural language understanding (natural language understanding, NLU) algorithm. Further, the server 102 may search for an audio resource corresponding to the current extracted intent and the current extracted slot information, and indicate the speaker to start playing the found audio resource, to complete a response to the current speech instruction input by the user.

Usually, speech instructions input by the user when the user performs speech interaction with the electronic device are continuous.

To accurately extract an intent and slot information in each speech instruction input by the user, the server 102 may store an intent and slot information that are extracted from the last speech instruction. For example, a first speech instruction input by the user is "play Faye Wong's Red Bean". An intent that may be extracted from the first speech instruction by the server 102 is to play music and slot information of the first speech instruction includes a song name "Red Bean" and a performer "Faye Wong". In addition, the server 102 may save the intent and the slot information of the first speech instruction as a context.

Subsequently, if the server 102 receives a second speech instruction "I want to listen to Fang Datong" input by the user, the server 102 may extract slot information "Fang Datong" of a performer from the second speech instruction. However, in this case, an intent and other slot information in the second speech instruction are incomplete, and the server 102 cannot obtain an accurate audio resource based only on the slot information "Fang Datong" extracted from the second speech instruction. In this case, the server 102 may query, in the stored context, the intent and the slot information extracted from the last speech instruction (namely, the first speech instruction). For example, the intent extracted from the first speech instruction is to play music, and the slot information includes the song name "Red Bean" and the performer "Faye Wong". The slot information extracted from the second speech instruction also includes the slot information of the performer, which indicates that the user wants to update the slot information of the performer in the second speech instruction. Further, the server 102 may determine that the intent in the second speech instruction is also to play music, and the slot information in the second speech instruction includes the song name Red Bean and the performer Fang Datong.

In this way, the server 102 may search for an audio resource corresponding to the intent and the slot information in the second speech instruction, and indicate the speaker to play the found audio resource, to complete a response to the second speech instruction input by the user.

In this embodiment of this application, the user may further interact with the electronic device 101 in another manner in addition to interacting with the electronic device 101 by inputting a speech instruction.

For example, the electronic device 101 is still a speaker. A touchscreen may be disposed in the speaker. The touchscreen may be configured to output a related UI interface to the user, and receive a touch operation input by the user. For example, the user may select audio content on the touchscreen, set a playlist, and adjust playback volume. In other words, the user may further interact with the speaker by inputting a touch operation on the touchscreen of the speaker. Alternatively, the speaker may have other physical buttons, and the user may interact with the speaker by using these physical buttons.

Figure 2:
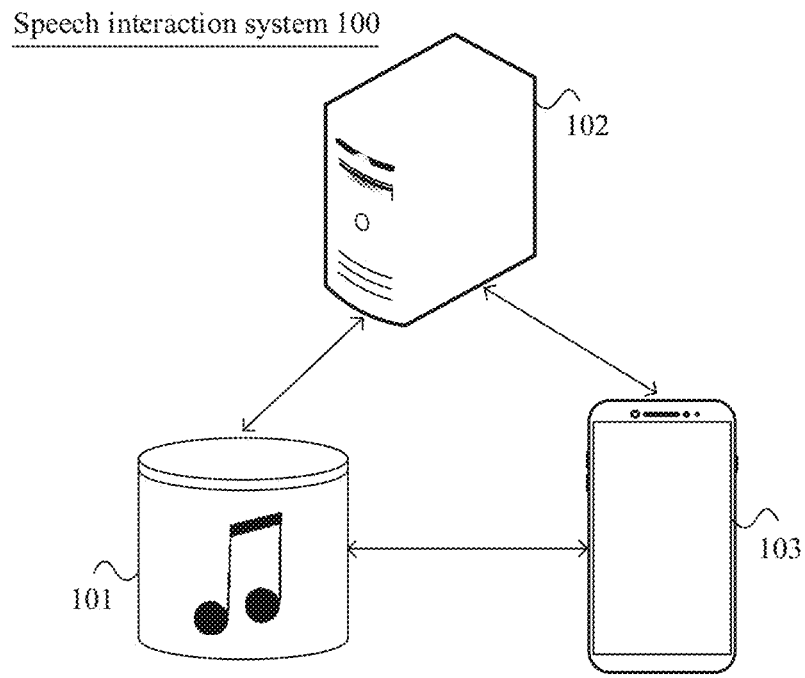
FIG. 2 is a schematic diagram 2 of a structure of a speech interaction system according to an embodiment of this application.

Alternatively, as shown in FIG. 2, the speech interaction system 100 may further include a mobile phone 103. The user may install a speaker APP on the mobile phone 103 to control the speaker. In this way, after the speaker and the mobile phone 103 access a same local area network or a same wide area network, the user may control the speaker to implement various functions by using the speaker APP on the mobile phone 103.

For example, the user may select audio content that the user wants to listen to in the speaker APP. After detecting that the user selects audio content 1, the mobile phone 103 may send an identifier of the audio content 1 to the server 102. Further, the server 102 may find an audio resource of the audio content 1 based on the identifier of the audio content 1, and indicate the speaker to play the found audio resource. In this way, the user may also interact with the speaker through the speaker APP on the mobile phone 103.

It can be learned that the user may interact with the speaker in a plurality of manners, such as using the speech instruction, the touchscreen or a button of the speaker, and a speaker APP on another electronic device. In this case, in a scenario in which a plurality of interaction manners are used, to accurately understand and extract an intent and slot information in each speech instruction input by the user, the server 102 may pre-store details of different pieces of audio content. The details may include one or more of identifiers of the audio content, names, performers, and audio types. In addition, a slot field used to indicate slot information and an intent field used to indicate an intent may be preset in the details, so that the server 102 may extract corresponding slot information from the slot field, and extract a corresponding intent from the intent field.

For example, as shown in Table 1, the server 102 separately stores details of three pieces of audio content: a song Red Bean, Pingshu Romance of the Three Kingdoms, and a children's story Romance of the Three Kingdoms. The details include the audio content, an audio type, a name, and a performer. The audio type is a preset intent field, and the name and the performer are preset slot fields. The song Red Bean is used as an example. An identifier of the song Red Bean is 001, an audio type of the song is "song", a name of the song is "Red Bean", and a performer of the song is "Faye Wong". Because the audio type is a preset intent field, when the audio type is "song", the server 102 may extract a corresponding intent that is to play a song. Correspondingly, because the name and the performer are preset slot fields, when the name is "Red Bean" and the performer is "Faye Wong", the server 102 may extract corresponding slot information including the name "Red Bean" and the performer "Faye Wong". Each piece of audio content may have one or more pieces of corresponding slot information. This is not limited in this embodiment of this application.

TABLE 1

| Identifier of audio content | Intent field Audio type | Slot field | |
|---|---|---|---|
| | | Name | Performer |
| 001 | Song | Red Bean | Faye Wong |
| 002 | Pingshu | Romance of the Three Kingdoms | Yuan Chengkuo |
| 003 | Children's story | Romance of the Three Kingdoms | |

Figure 3:
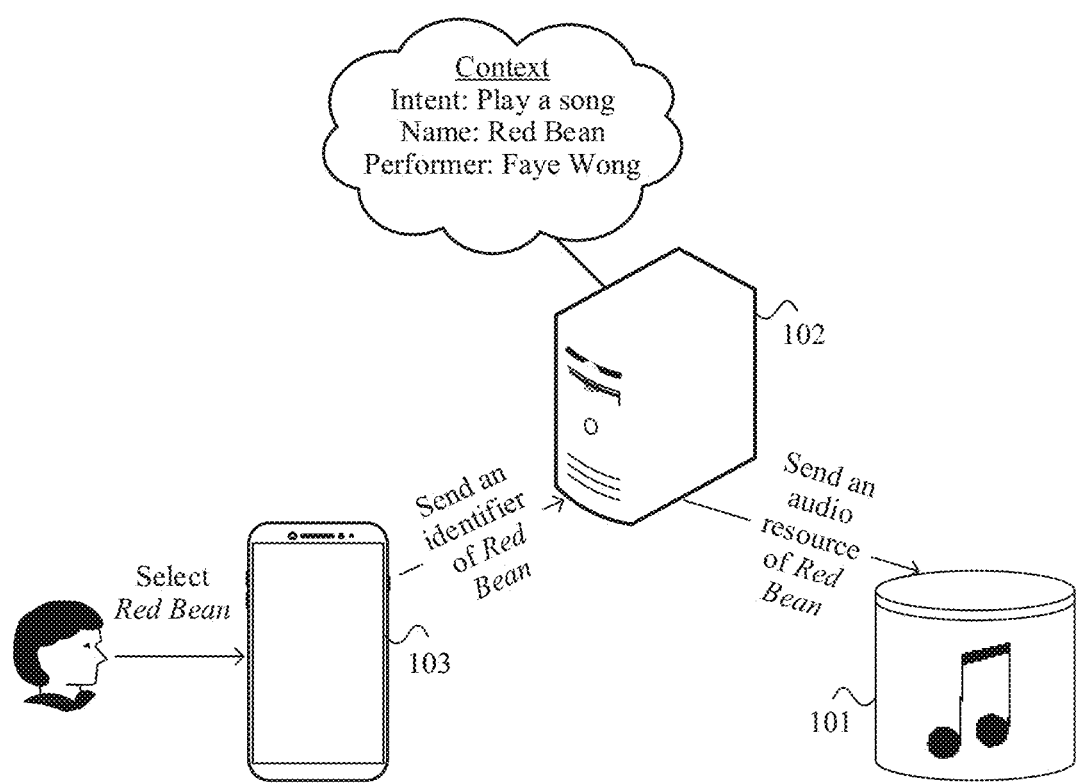
FIG. 3 is a schematic diagram of an interaction principle of a speech interaction system according to an embodiment of this application.

In this case, when the user interacts with the speaker by using a non-speech instruction, the server 102 may determine, based on an identifier of audio content reported by the speaker or another electronic device (for example, the mobile phone 103), an intent and slot information that correspond to a current operation of the user from a corresponding intent field and a corresponding slot field. For example, as shown in FIG. 3, after the mobile phone 103 detects that the user selects the song Red Bean on the speaker APP, the mobile phone 103 may send the identifier 001 of the song Red Bean to the server 102. Further, the server 102 may determine, based on a correspondence shown in Table 1, that an intent corresponding to a current on-demand operation of the user is to play a song, and corresponding slot information includes the name "Red Bean" and the performer "Faye Wong". In this case, the server 102 may save the current determined intent and the current determined slot information as a context.

In this way, if the server 102 subsequently receives a speech instruction that is reported by the speaker and whose intent or slot information is incomplete, the server 102 may determine an intent and slot information of the current speech instruction based on the intent and the slot information stored in the context. Therefore, accuracy of extracting an intent and slot information in a speech instruction of a user in a speech interaction scenario is improved, and further, accuracy of responding to a speech instruction by an electronic device is improved, so that the user may still obtain better speech interaction experience in a speech interaction scenario in which another interaction manner is used.

Certainly, as shown in FIG. 3, after receiving the identifier 001 sent by the mobile phone 103, the server 102 may further obtain a corresponding audio resource, for example, a uniform resource locator (uniform resource locator, URL) of the song Red Bean based on the identifier 001. Further, the server 102 may send the URL of the song Red Bean to the speaker by carrying the URL in a play instruction, so that the speaker may play the song Red Bean based on the URL, to implement a process of controlling the speaker through the speaker APP by the user. Certainly, in addition to the URL, the server 102 may further obtain the corresponding audio resource by using another identifier that can uniquely identify the audio content. This is not limited in this embodiment of this application.

For example, the electronic device 101 may be specifically an electronic device having a speech interaction function, for example, a speaker, a mobile phone, a tablet computer, a notebook computer, an ultra-mobile personal computer (ultra-mobile personal computer, UMPC), a handheld computer, a netbook, a personal digital assistant (personal digital assistant, PDA), a wearable electronic device, an automobile head unit, or a virtual reality device. This is not limited in this embodiment of this application.

Figure 4:
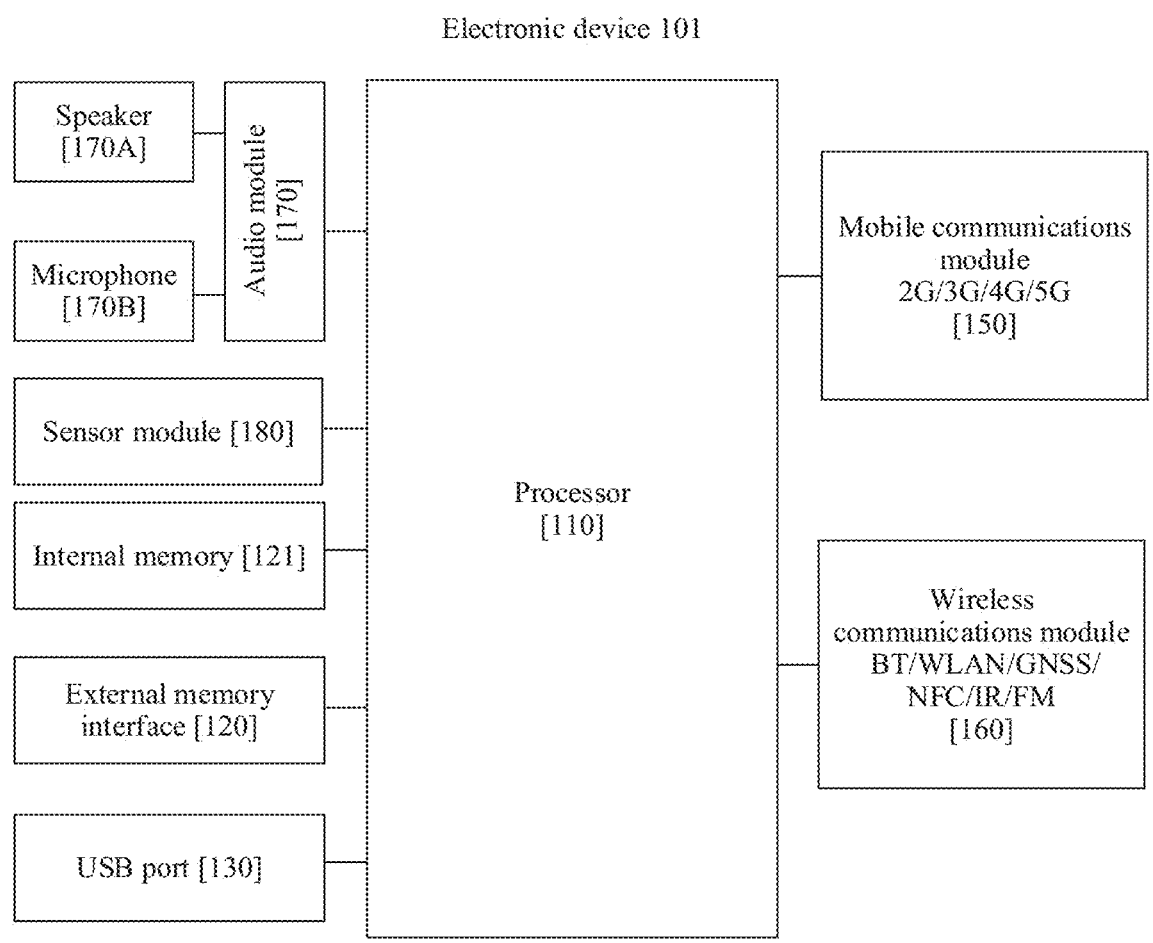
FIG. 4 is a schematic diagram of a structure of an electronic device according to an embodiment of this application.

For example, FIG. 4 is a schematic diagram of a structure of the electronic device 101.

The electronic device 101 may include a processor 110, an external memory interface 120, an internal memory 121, a universal serial bus (universal serial bus, USB) port 130, a mobile communications module 150, a wireless communications module 160, an audio module 170, a speaker 170A, a microphone 170B, a sensor module 180, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110. Therefore, system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The mobile communications module 150 may provide a solution that is applied to the electronic device 101 and that includes wireless communications technologies such as 2G, 3G, 4G, and 5G. The mobile communications module 150 may include one or more filters, a switch, a power amplifier, a low noise amplifier (low noise amplifier, LNA), and the like. The mobile communications module 150 may receive an electromagnetic wave through an antenna 1, perform processing such as filtering and amplification on the received electromagnetic wave, and transfer a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules in the mobile communications module 150 and at least some modules in the processor 110 may be disposed in a same device.

The wireless communications module 160 may provide a wireless communications solution that includes wireless local area networks (wireless local area networks, WLAN) (such as, a wireless fidelity (wireless fidelity. Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 101. The wireless communications module 160 may be one or more components integrating one or more communications processor modules. The wireless communications module 160 receives an electromagnetic wave through an antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

The external memory interface 120 may be configured to connect to an external storage card, for example, a micro SD card, to extend a storage capability of the electronic device 101. The external storage card communicates with the processor 110 through the external memory interface 120, to implement a data storage function. For example, files such as music and videos are stored in the external storage card.

The internal memory 121 may be configured to store one or more computer programs, and the one or more computer programs include instructions. The processor 110 may run the instructions stored in the internal memory 121, so that the electronic device 101 performs a method for intelligently recommending a contact provided in some embodiments of this application, various functional applications, data processing, and the like. The internal memory 121 may include a program storage area and a data storage area. The program storage area may store an operating system. The program storage area may further store one or more applications (for example, Gallery and Contacts), and the like. The data storage area may store data (for example, a photo and a contact) created during use of the electronic device 101, and the like. In addition, the internal memory 121 may include a high-speed random access memory, and may further include a nonvolatile memory, for example, one or more magnetic disk storage devices, a flash memory device, or a universal flash storage (universal flash storage, UFS). In some other embodiments, the processor 110 runs the instructions stored in the internal memory 121 and/or the instructions stored in the memory disposed in the processor, so that the electronic device 101 performs the speech interaction method provided in the embodiments of this application, various functional applications, and data processing.

The electronic device 101 may use the audio module 170, the speaker 170A, the microphone 170B, the application processor, and the like, to implement an audio function, for example, playing music and recording.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The electronic device 101 may be configured to listen to music or answer a call in a hands-free mode over the speaker 170A.

The microphone 170B, also referred to as a "mike" or a "microphone", is configured to convert a sound signal into an electrical signal. When making a call or sending voice information, a user may move the mouth of the user close to the microphone 170B to make a sound, to input a sound signal to the microphone 170B. One or more microphones 170B may be disposed in the electronic device 101. In some other embodiments, two microphones 170B may be disposed in the electronic device 101, to collect a sound signal and further implement a noise reduction function. In some other embodiments, three, four, or more microphones 170B may alternatively be disposed in the electronic device 101, to collect a sound signal, reduce noise, identify a sound source, implement a directional recording function, and the like.

The sensor 180 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, or the like. This is not limited in this embodiment of this application.

It may be understood that the structure shown in this embodiment of the present invention does not constitute a specific limitation on the electronic device 101. In some other embodiments of this application, the electronic device 101 may include more or fewer components than those shown in the figure, or combine some components, or split some components, or have different component arrangements. The components shown in the figure may be implemented by using hardware, software, or a combination of software and hardware.

For example, when the electronic device 101 is a speaker, the electronic device 101 may further include one or more components such as a GPU, a display, a camera, and a button. This is not limited in this embodiment of this application.

For another example, when the electronic device 101 is a mobile phone, the electronic device 101 may further include one or more components such as a GPU, a display, a camera, a headset jack, a button, a battery, a motor, an indicator, and a SIM card interface. This is not limited in this embodiment of this application.

The following specifically describes a speech interaction method provided in an embodiment of this application with reference to accompanying drawings. In the following embodiments, for example, the electronic device 101 is a speaker.

Figure 5:
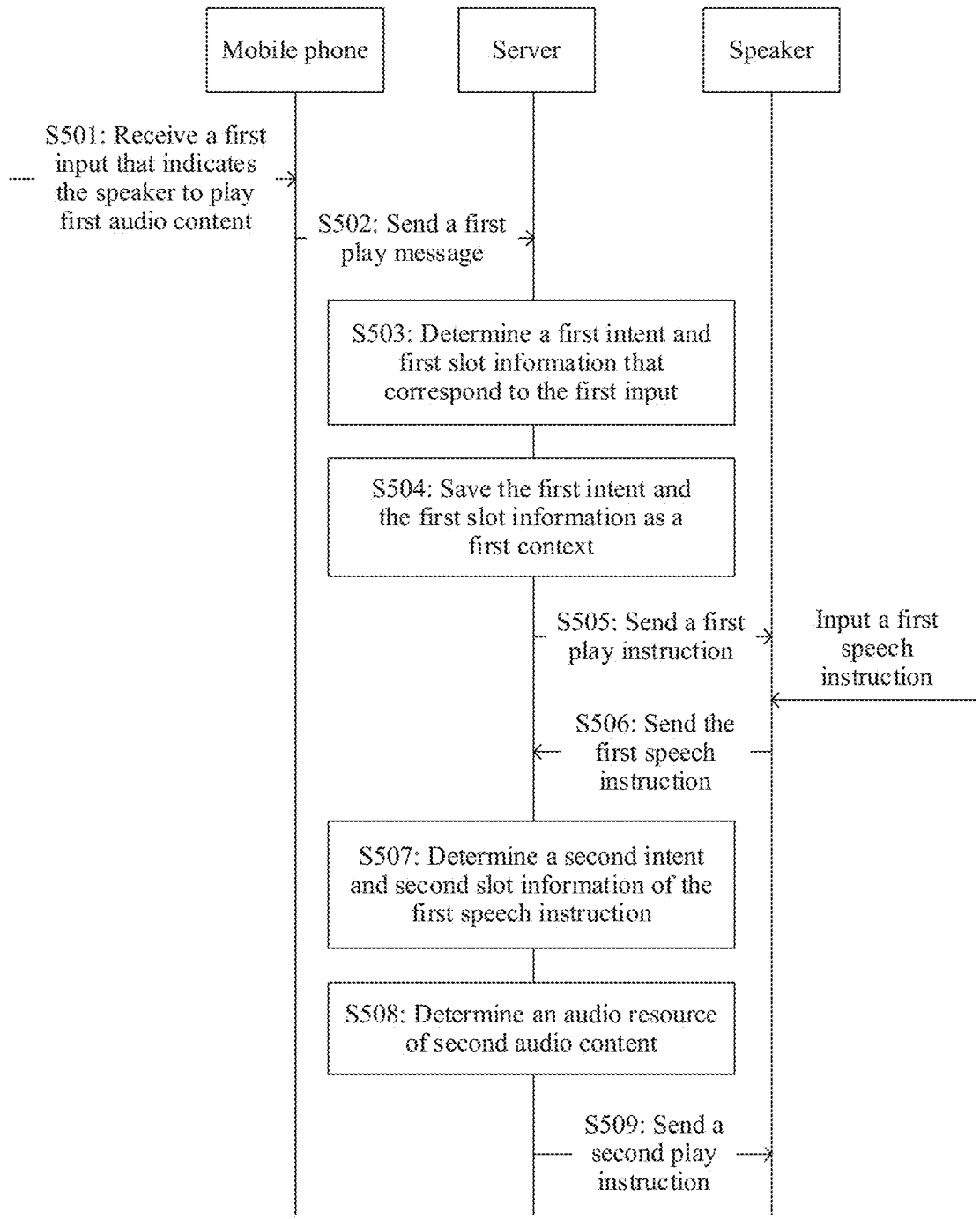
FIG. 5 is a schematic diagram of interaction of a speech interaction method according to an embodiment of this application.

FIG. 5 is a schematic flowchart of a speech interaction method according to an embodiment of this application. As shown in FIG. 5, the speech interaction method may include the following steps.

S501: A mobile phone receives a first input that is of a user in a speaker APP and that is used to indicate a speaker to play first audio content.

Figure 6:
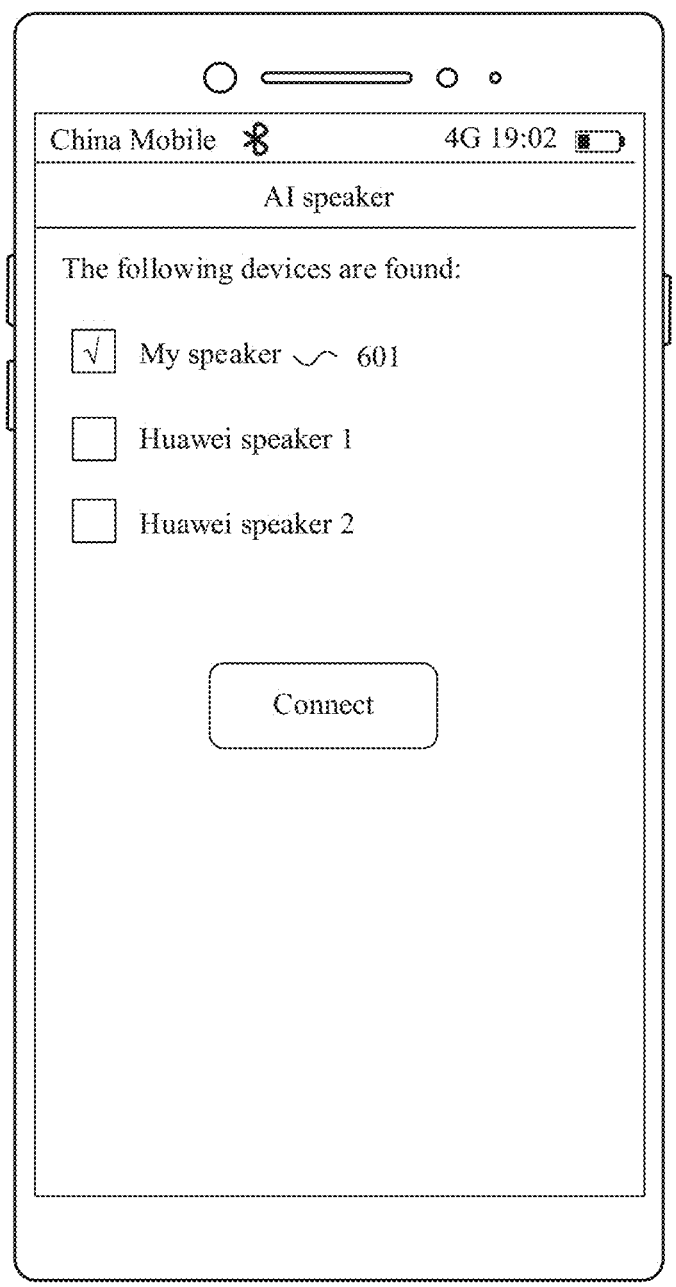
FIG. 6 is a schematic diagram 1 of a scenario of a speech interaction method according to an embodiment of this application.

In some embodiments, the user may control, by using the speaker APP installed on the mobile phone, the speaker to play corresponding audio content. For example, the user may enable Bluetooth functions of the mobile phone and the speaker. Further, as shown in FIG. 6, after detecting that the user opens the speaker APP on the mobile phone, the mobile phone searches for a currently connectable Bluetooth device. If the mobile phone detects that the user selects "My speaker" 601 to establish a connection, the mobile phone may establish a Bluetooth connection to a speaker whose name is "My Speaker". In addition, if the mobile phone has established a Bluetooth connection to the speaker, after the user opens the speaker APP, the mobile phone may automatically establish the Bluetooth connection to the speaker that is found. Certainly, the mobile phone and the speaker may further establish a communication connection through a Wi-Fi network, a cellular Internet, or the like. This is not limited in this embodiment of this application.

Figure 7A:
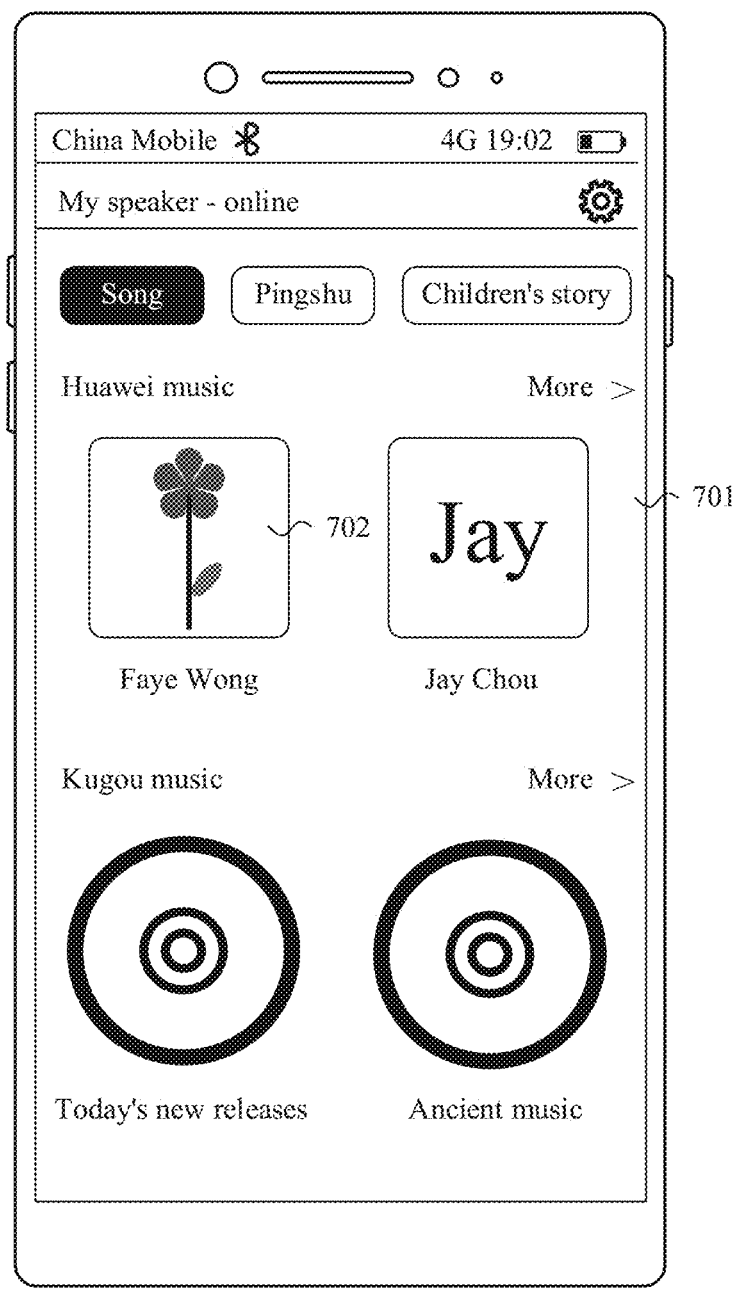
FIG. 7 is a schematic diagram 2 of a scenario of a speech interaction method according to an embodiment of this application.
Figure 7B:
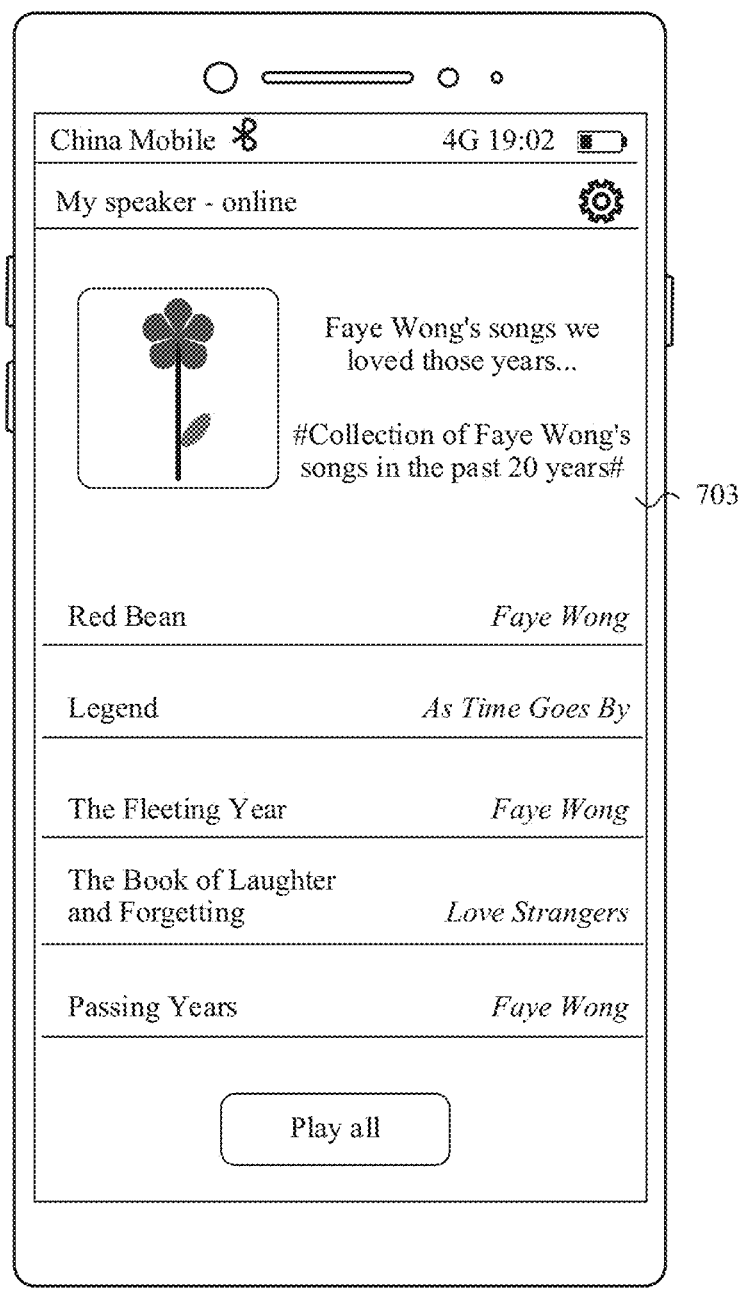

After the mobile phone establishes the Bluetooth connection to the speaker, as shown in FIG. 7(*a*), the mobile phone may display a home page 701 of the speaker APP. The home page 701 includes different types of audio content, and the user may select corresponding audio content on the home page 701 for playing on the speaker. For example, if the mobile phone detects that the user taps an album 702 of Faye Wong on the home page 701, the mobile phone may display a program list of the album 702 on a program list interface 703, as shown in FIG. 7(*b*). The program list interface 703 may include information, for example, a name, an album name, and a performer of each piece of audio content in the album 702. If the mobile phone detects that the user taps a piece of audio content (for example, Red Bean) on the program list interface 703, it indicates that the user wants to play the song Red Bean in the album 702 on the speaker. In this case, an operation of selecting Red Bean by the user may be referred to as the first input, and the audio content Red Bean selected by the user may be referred to as the first audio content. In response to the first input, the mobile phone may continue to perform the following step S502.

S502: In response to the first input, the mobile phone sends a first play message to a server, where the first play message includes an identifier of the first audio content.

For example, the user still selects the song Red Bean on the program list interface 703 as the first input. Both the mobile phone and the server store an identifier corresponding to each piece of audio content in the album 702. For example, an identifier corresponding to the song Red Bean is 001. In this case, after receiving the first input, the mobile phone may send the first play message that carries the identifier 001 of the song Red Bean to the server, that is, notify the server that the song Red Bean corresponding to the identifier 001 needs to be played on the speaker.

In addition, if the mobile phone detects that the user taps the song Red Bean on the program list interface 703, the mobile phone may further play by default the audio content in the album 702 by starting from the song Red Bean. In other words, after the song Red Bean is played, the mobile phone may automatically send a second play message for playing a song Legend in the album 702 to the server. Similar to the first play message, the second play message may include an identifier of second audio content (namely, the song Legend).

In some embodiments, if the first input is generated by an operation actively input by the user, for example, the user taps the song Red Bean in the album 702, the first play message sent by the mobile phone may further carry a preset first identifier, for example, an identifier A used to indicate that the operation of playing the first audio content is an active operation of the user. Correspondingly, when the song Legend (namely, the second audio content) in the album 702 is automatically played after the song Red Bean is played, the play operation is automatically triggered by the mobile phone instead of being manually selected by the user. Therefore, when sending the second play message, the mobile phone may carry a preset second identifier in the second play message, for example, an identifier B used to indicate that the operation of playing the second audio content is not an active operation of the user. Alternatively, if a play message does not carry the preset first identifier, the server may determine that an operation corresponding to the play message is not an active operation of the user.

Alternatively, if the mobile phone detects that the user manually selects the song Red Bean, the mobile phone may send the first play message in a first format. If the mobile phone detects that the mobile phone automatically switches to and plays the next song Legend, the mobile phone may send the second play message in a second format. In this way, each time after receiving a play message, the server may determine, based on a format of the play message, whether an operation of playing current audio content is actively triggered by the user.

S503: The server determines, based on the identifier of the first audio content, a first intent and first slot information that correspond to the first input.

For example, the server may pre-store details of different pieces of audio content, and the details may include one or more of identifiers, names, performers, audio types, version types, and the like of the audio content. For example, for the song Red Bean, the identifier of the audio content is 001, the name is Red Bean, the performer is Faye Wong, and the audio type is song. In this case, the server may preset one or more items of the details as a slot field, and preset one or more items of the details as an intent field.

For example, as shown in Table 2, an audio type of audio content may be preset as an intent field, and three fields of the audio content, namely, a name, a performer, and a version type are preset as a slot field. In this case, the server may extract, by using the preset intent field, an intent corresponding to corresponding audio content, and the intent is to play a song, play Pingshu, play a children's story, or the like. In addition, the server may extract, by using the preset slot field, slot information, for example, a specific name or a specific performer, corresponding to corresponding audio content.

TABLE 2

| Identifier of audio content | Intent field Audio type | Slot field | | |
| --- | --- | --- | --- | --- |
| | | Name | Performer | Version type |
| 001 | Song | Red Bean | Faye Wong | |
| 002 | Song | Legend | Faye Wong | |
| 003 | Children's story | Romance of the Three Kingdoms | | |
| 004 | Pingshu | Romance of the Three Kingdoms | Yuan Chengkuo | |
| 005 | Song | Red Bean | Fang Datong | Live version |

For example, if the first play message that is sent by the mobile phone and that is received by the server carries the identifier 001, the server may extract, based on a correspondence shown in Table 1, the first intent, namely, to play a song, of the current first input of the user from an intent field corresponding to the identifier 001. In addition, the server may extract the first slot information corresponding to the first input from a slot field corresponding to the identifier 001, where the first slot information includes the name Red Bean of the first audio content, and the performer Faye Wong of the first audio content. In other words, in this embodiment of this application, the server may map an input (for example, the first input) of the user in the speaker APP to a corresponding intent and corresponding slot information. That is, an effect of the first input input by the user into the speaker APP on the mobile phone is the same as that of a speech instruction "play Faye Wong's Red Bean" input by the user.

In some embodiments, the server may further preset that some intents in the foregoing intent field are inheritable. For example, an intent, namely, to play a song, may be set as an inheritable intent. To be specific, when an operation or a speech instruction subsequently input by the user does not carry an explicit intent, if an intent extracted last time by the server is an inheritable intent (for example, to play a song), the server may determine that an intent corresponding to a current operation or a current speech instruction input by the user is still to play a song.

Similarly, the server may further preset that some slots in the foregoing slot field are inheritable. For example, a name of audio content may be set as an inheritable slot. To be specific, when an operation or a speech instruction subsequently input by the user does not carry an explicit name of audio content, if a name of audio content in slot information extracted last time by the server is inheritable (for example, Red Bean), the server may determine that a name of audio content corresponding to the current operation or the current speech instruction input by the user is still Red Bean.

S504: The server saves the first intent and the first slot information as a first context.

For example, the first intent of the first input is still to play a song, and the first slot information of the first input still includes the name "Red Bean" and the performer "Faye Wong". After extracting the first intent and the first slot information based on the correspondence shown in Table 2, the server may save the first intent and the first slot information as a context, so that when the mobile phone or the speaker subsequently interacts with the server, the server may determine, based on content in the context, a second intent and second slot information that correspond to a next input of the user.

In other words, in this embodiment of this application, when the user interacts with the speaker by using the first input, namely, a non-speech instruction manner, the server may also determine the first intent and the first slot information that correspond to the first input, and save the first intent and the first slot information as the context. In this way, if the server subsequently receives a speech instruction whose intent or slot information is incomplete, the server may respond to the speech instruction based on the stored context, to improve accuracy of responding to the speech instruction by the speaker and improve user experience.

In some embodiments, when saving the first intent and the first slot information as the context, the server may further record an effective time of the context. For example, the server may set a time point (for example, 19:58:10) at which the first intent and the first slot information are saved as the effective time of the current context.

In some embodiments, the server may preset two types of contexts, namely, the first context and a second context. The first context is a context extracted in response to a control operation actively input by the user into the speaker. For example, after the user selects the song Red Bean in the speaker APP, a context generated by the server is the first context. For another example, after the user inputs a speech instruction "I want to listen to the song Red Bean", a context generated by the server is the first context. Correspondingly, the second context is a context generated in response to a control operation not actively input by the user into the speaker. For example, when the speaker automatically switches to the song Legend after playing the song Red Bean, a context generated by the server is the second context. Usually, a priority of the first context is higher than a priority of the second context.

For example, if the first play message sent to the server by the mobile phone in step S502 carries the first identifier A, the server may save the first intent and the first slot information extracted in step S503 as the first context, and set an effective time of the current first context. Correspondingly, if the first play message sent to the server by the mobile phone in step S502 carries the second identifier B, the server may save the first intent and the first slot information extracted in step S503 as the second context, and set an effective time of the current second context.

In addition, when the second context meets a preset condition, the server may upgrade the second context to the first context. For example, when the speaker automatically switches to the song Legend after playing the song Red Bean, the speaker may report a play message that carries the second identifier B to the server. In this case, the server may save an intent and slot information that correspond to the song Legend as the second context, and set the effective time of the current second context to 19:58:10. If no new play message or speech instruction is received within a preset period of time (for example, 30 seconds), which indicates that the user agrees to play the song Legend, the server may upgrade the second context to the first context, and delete content in the second context. In this case, the effective time of the first context is updated to 19:58:40. Alternatively, when the speaker plays the song Legend for more than a preset value (for example, 30 seconds), which indicates that the user agrees to play the song Legend, the speaker may actively report a current play process to the server, to trigger the server to upgrade the second context to the first context.

S505: The server sends a first play instruction to the speaker, where the first play instruction includes an audio resource of the first audio content.

For example, the first intent of the first input is still to play a song, and the first slot information of the first input still includes the name "Red Bean" and the performer "Faye Wong". After extracting the first intent and the first slot information based on the correspondence shown in Table 2, the server may obtain an audio resource corresponding to the first intent and the first slot information, namely, the audio resource of the first audio content.

For example, the server may query a URL of the song Red Bean based on the identifier 001 of the song Red Bean, where the URL is an audio resource of the song Red Bean. Further, the server may send the URL of the song Red Bean to the speaker by carrying the URL in the first play instruction. In this way, the speaker may obtain an audio file of the song Red Bean based on the URL in the first play instruction. In addition, the speaker may start to play the audio file of the song Red Bean, to respond to the first input input by the user into the speaker APP.

It should be noted that a sequence in which the server performs steps S504 and S505 is not limited in this embodiment of this application. After extracting the first intent and the first slot information, the server may perform step S504 before step S505. Alternatively, step S505 may be performed before step S504, or step S504 and step S505 may be performed simultaneously. This is not limited in this embodiment of this application.

S506: The speaker sends a first speech instruction to the server in response to the first speech instruction input by the user into the speaker.

Through the foregoing steps S501 to S505, the user may control, by inputting the first input into the speaker APP on the mobile phone, the speaker to play the first audio content (for example, the song Red Bean), and the server may store the first intent and the first slot information that correspond to the first input as a context.

Subsequently, the user may interact with the speaker by inputting a speech instruction. For example, in step S506, the user may input the first speech instruction into the speaker. After receiving the first speech instruction input by the user, the speaker may send the first speech instruction to the server, and the server determines an intent (namely, the second intent) and slot information (namely, the second slot information) that correspond to the first speech instruction. The first speech instruction sent by the speaker to the server may be a speech instruction, or a text instruction. This is not limited in this embodiment of this application.

Figure 8:
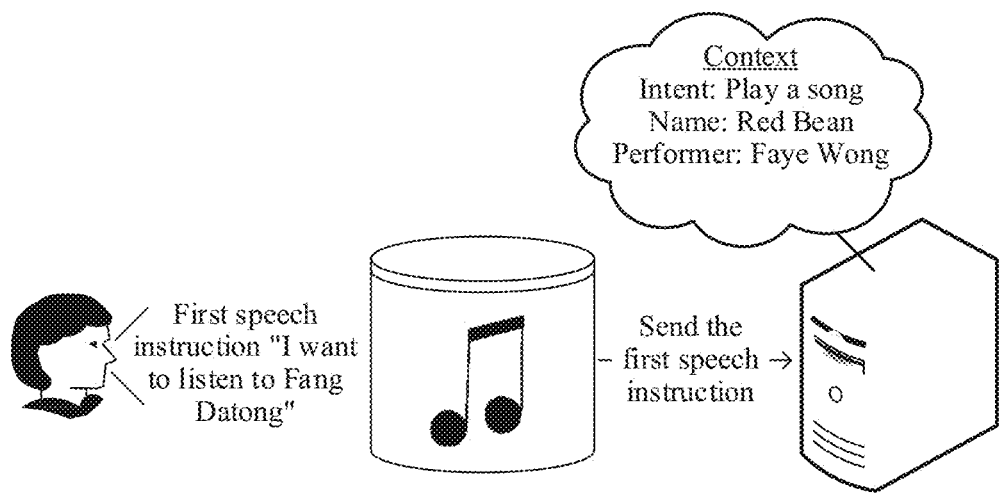
FIG. 8 is a schematic diagram 3 of a scenario of a speech interaction method according to an embodiment of this application.

For example, as shown in FIG. 8, when the speaker is playing the song Red Bean sung by Faye Wong, if the user wants to listen to Red Bean sung by another performer (for example, Fang Datong), the user may input the first speech instruction "I want to listen to Fang Datong" into the speaker. Further, the speaker may send the first speech instruction "I want to listen to Fang Datong" to the server.

S507: The server determines the second intent and the second slot information in the first speech instruction based on the first context.

After receiving the first speech instruction sent by the speaker, the server may extract the second intent and the second slot information in the first speech instruction by using a preset NLU algorithm. For example, the first speech instruction is still "I want to listen to Fang Datong". The server may extract the slot information Fang Datong of the performer by using the NLU algorithm. However, the server cannot determine, based only on the slot information "Fang Datong", audio content that needs to be played by the user. In other words, the server cannot extract a complete second intent and complete second slot information from the first speech instruction. As a result, the server cannot determine audio content for the server to respond to the first speech instruction this time.

In this embodiment of this application, when the second intent or the second slot information or both in the first speech instruction are incomplete, the server may obtain the intent and the slot information (for example, the first intent and the first slot information) that are extracted last time by the server and that are stored in the context (for example, the first context). Further, the server may determine, based on the first intent and the first slot information, a complete second intent and complete second slot information that correspond to the first speech instruction.

For example, the first intent stored in the first context is to play a song, the name in the first slot information is Red Bean, and the performer in the first slot information is Faye Wong. The performer that is in the first slot information and that is extracted from the first speech instruction by the server is Fang Datong. Because the first intent is an inheritable intent, and the name in the first slot information is an inheritable slot, the server may inherit the first intent and also determine the second intent as to play a song. In addition, the server may inherit the name in the first slot information and also determine the name in the second slot information as Red Bean; and the server may determine that the performer in the second slot information is Fang Datong.

For another example, if the first input input by the user in step S501 is to select Pingshu Romance of the Three Kingdoms in the speaker APP, the server may extract the first intent corresponding to the first input, the first intent is to play Pingshu, and the name in first slot information is Romance of the Three Kingdoms. In addition, the server may store the first intent and the first slot information as the first context. Subsequently, if the received first speech instruction input by the user is "listen to a children's story", the server may extract the second intent, namely, play a children's story, from the first speech instruction, but in this case, the first speech instruction does not contain explicit slot information. Further, the server may obtain the first slot information in the first context. Because the name in the first slot information is also an inheritable slot, the server may inherit the name in the first slot information and determine the name in second slot information as Romance of the Three Kingdoms. In this case, the server may determine that the second intent corresponding to the first speech instruction "listen to a children's story" is to play a children's story, and the corresponding second slot information is Romance of the Three Kingdoms.

It can be learned that when an intent or slot information in a speech instruction input by the user is incomplete, the user interacts with the speaker in a non-speech instruction manner, for example, by using the speaker APP before the speech instruction is input. However, because the server stores a context of last interaction between the user and the speaker, the server may determine, based on the context, an intent and slot information that correspond to the current speech instruction, to improve accuracy of responding by an electronic device to the speech instruction input by the user in a speech interaction scenario. Therefore, the user obtains better user experience.

In addition, similar to step S504, after the server determines the second intent and the second slot information of the first speech instruction, the server may delete content in the stored context, and store the second intent and the second slot information as a new context.

For example, because the first speech instruction input by the user is the control operation actively input by the user into the speaker, the first speech instruction may carry the first identifier A. In this case, after determining the second intent and the second slot information of the first speech instruction, the server may delete the content in the first context, store the second intent and the second slot information of the first speech instruction as a new first context, and record an effective time of the current first context.

In some other embodiments of this application, the server may determine the second intent and the second slot information of the first speech instruction based on the second context.

For example, after obtaining the first speech instruction, the server may query the context stored in the server. If the server stores only the first context but does not store the second context, the server may determine, based on the intent and the slot information in the first context, the second intent and the second slot information of the first speech instruction according to the foregoing method.

Alternatively, if the server stores only the second context but does not store the first context, the server may determine the second intent and the second slot information of the first speech instruction based on the second context. For example, when there is no second intent or the second intent is incomplete in the first instruction, the server may determine an inheritable intent in the second context as the second intent. For another example, when there is no second slot information or the second slot information is incomplete in the first instruction, the server may determine inheritable slot information in the second context as the second slot information.

Alternatively, if the server stores both the first context and the second context, the server may determine the second intent and the second slot information based on the effective time of the second context with reference to the first context or the second context. For example, if a time interval between a current time and the effective time of the second context is less than a first preset value (for example, 3 s), it indicates that the speaker has just automatically switched to a next audio content, and that the first speech instruction input by the user may be for last audio content (namely, audio content corresponding to the first context). In this case, the server may determine the second intent and the second slot information of the first speech instruction based on the first context. For another example, if the time interval between the current time and the effective time of the second context is greater than a second preset value (for example, 15 s), it indicates that the speaker has switched to and played the next audio content for a period of time, and that the first speech instruction input by the user may be for switched audio content (namely, audio content corresponding to the second context). In this case, the server may determine the second intent and the second slot information of the first speech instruction based on the second context.

In addition, if the time interval between the current time and the effective time of the second context falls within a range between the first preset value and the second preset value, the server may determine the second intent and the second slot information of the first speech instruction based separately on the first context and the second context, and obtain an intent A and slot information A that correspond to the first context, and an intent B and slot information B that correspond to the second context. Further, the server may score confidence levels of the intent A and the slot information A, and confidence levels of the intent B and the slot information B. Finally, the server may use an intent and slot information with higher scores as the second intent and the second slot information of the first speech instruction.

S508: The server determines an audio resource of the second audio content based on the second intent and the second slot information.

S509: The server sends a second play instruction to the speaker, where the second play instruction includes the audio resource of the second audio content.

For example, the second intent is still to play a song, and the second slot information still includes the name "Red Bean" and the performer "Fang Datong". In step S508, the server may obtain the audio resource of the second audio content corresponding to the second intent and the second slot information, for example, a URL of the second audio content.

Further, in step S509, the server may send the URL of the second audio content to the speaker by carrying the URL in the second play instruction. In this way, the speaker may obtain, based on the URL in the second play instruction, an audio file of the song Red Bean sung by Fang Datong. In addition, the speaker may start to play the audio file, to respond to the first speech instruction input by the user into the speaker.

The foregoing embodiment is described by using an example in which the mobile phone reports the identifier of the first audio content to the server after the user inputs the first input into the speaker APP. In some embodiments, the mobile phone may further store the details of each piece of audio content. In this case, for example, the user taps the song Red Bean on the program list interface 703. The mobile phone may send details such as the identifier of the song Red Bean, to the server. The server extracts the corresponding first intent and the corresponding first slot information based on the correspondence shown in Table 2. Alternatively, the mobile phone may send some details of the song Red Bean to the server, and the server may supplement, based on the correspondence shown in Table 2, all details corresponding to the song Red Bean, and extract the corresponding first intent and the corresponding first slot information.

In some other embodiments, for example, the user taps the song Red Bean on the program list interface 703. After receiving the first input of the user, the mobile phone may first send the first play message that carries the identifier of the song Red Bean to the speaker. Further, the speaker forwards the first play message to the server. Alternatively, when the speaker sends the first play message to the server, the first play message may further carry an identifier, speaker APP, of a current operation source, so that the server may determine, based on the identifier, that the first play message is generated in response to the first input of the user in the speaker APP.

Certainly, when the mobile phone sends the first play message to the speaker, the first play message may further carry one or more of details of the song Red Bean in addition to the identifier of the song Red Bean. This is not limited in this embodiment of this application.

In some other embodiments, after the server receives the first play message sent by the mobile phone or the speaker, the server may first save an identifier (for example, the identifier of the song Red Bean) of audio content in the first play message as a context. When the server subsequently receives a speech instruction (for example, the first speech instruction) whose intent or slot information is incomplete, the server may extract, based on the identifier of the audio content in the context, the corresponding first intent and first slot information from the correspondence shown in Table 2. Further, the server may determine, based on the first intent and the first slot information, the second intent and the second slot information that correspond to the current first speech instruction, and provide the second audio content corresponding to the second intent and the second slot information for the user.

Subsequently, the user may still interact with the speaker in the foregoing manner by using the speaker APP, a speech instruction, or in another interaction manner. No matter in which interaction manner, the server may determine an intent and slot information that correspond to the last interaction between the user and the speaker, and save the intent and the slot information as a context. In this way, when the server subsequently receives a speech instruction whose intent or slot information is incomplete, the server may determine, based on the intent and the slot information in the context, an intent and slot information that correspond to the current speech instruction, so that the speaker may still accurately respond to a speech instruction of the user in a speech interaction scenario in which another interaction manner is used. Therefore, the user has better speech interaction experience.

It can be learned that when the user inputs a first non-speech instruction into the speaker in a non-speech instruction manner, the server may still extract a first intent and first slot information that correspond to the first non-speech instruction, and store the first intent and the first slot information as a context. In this way, when the server subsequently receives the first speech instruction whose intent or slot information is incomplete, the server may accurately determine, based on the first intent and the first slot information in the context, the second intent and the second slot information that correspond to the first speech instruction.

For example, the user may first select the song Red Bean by using the speaker APP. In this case, the first non-speech instruction input by the user is an operation of selecting the song Red Bean in the speaker APP. Further, the server may extract, according to the method in the foregoing embodiment, the first intent, namely, to play a song, corresponding to the first non-speech instruction, and a name in the first slot information is "Red Bean". In this case, the server stores the first intent and the first slot information as a context. Subsequently, the server may receive the first speech instruction input by the user into the speaker, for example, the first speech instruction is "a live version". Because an intent and a name cannot be extracted from the first speech instruction, the server may determine, based on the first intent and the first slot information in the context, the first intent "play a song" as the second intent, the name in the first slot information as the name in the second slot information, and a version type in the second slot information as "a live version". Further, the server may send an audio resource corresponding to the second intent and the second slot information to the speaker for playing.

For another example, regardless of whether the user selects the song Red Bean by using the speaker APP or by using a speech instruction, the server may extract the corresponding first intent, namely, to play a song, and the name in the first slot information is "Red Bean". In this case, the server stores the first intent and the first slot information as a context. After playing the song Red Bean, the speaker may automatically switch to next audio content in a playlist, for example, the song Legend. In this case, the server may still extract the corresponding second intent, namely, to play a song, based on an identifier of the song "Legend", and the name in the second slot information is "Legend". Further, the server may update the content in the context, and store the second intent and the second slot information as the context. If the server subsequently receives a speech instruction whose intent or slot information is incomplete, the server may determine, based on the second intent and the second slot information stored in the current context, a third intent and third slot information that correspond to the speech instruction. For a specific interaction process of the speaker APP, the speaker, and the server, refer to related description in S501 to S509 in the foregoing embodiment. Details are not described herein again.

Figure 9:
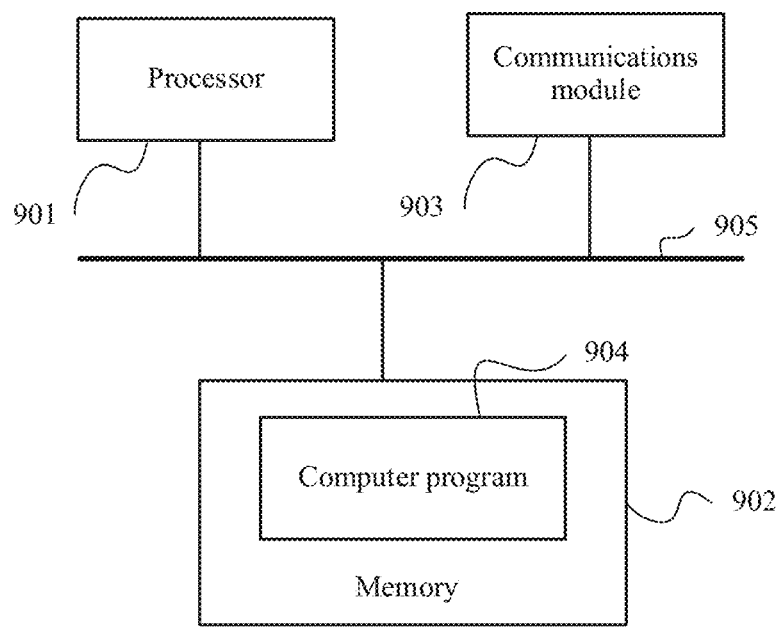
FIG. 9 is a schematic diagram of a structure of a server according to an embodiment of this application.

As shown in FIG. 9, an embodiment of this application discloses a server including a processor 901, a memory 902, a communications module 903, and one or more computer programs 904. The foregoing components may be connected by one or more communications buses 905. The one or more computer programs 904 are stored in the memory 902 and are configured to be executed by the one or more processors 901, and the one or more computer programs 904 include instructions. The instructions may be used to perform the steps performed by the server in steps S501 to S509 in the foregoing embodiment.

The foregoing descriptions about implementations allow a person skilled in the art to clearly understand that, for the purpose of convenient and brief description, division of the foregoing function modules is taken as an example for illustration. In actual application, the foregoing functions can be allocated to different modules and implemented according to a requirement. To be specific, an inner structure of an apparatus is divided into different function modules to implement all or some of the functions described above. For a detailed working process of the foregoing system, apparatus, and unit, refer to a corresponding process in the foregoing method embodiments. Details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the current technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed m the embodiments of this application shall fall within the protection scope of the embodiments of this application. Therefore, the protection scope of the embodiments of this application shall be subject to the protection scope of the claims.

What is claimed is:

1. A speech interaction method, implemented by a server, the method comprising:
   receiving a first play message, wherein the first play message comprises an identifier of first audio content, and wherein the first play message is generated in response to a first non-speech instruction input by a user into a playback device;
   determining, based on the identifier of the first audio content, a first intent and first slot information that correspond to the first non-speech instruction;
   storing the first intent and the first slot information as a context when the first play message carries a preset identifier;
   instructing, in response to the first play message, the playback device to play the first audio content;
   receiving, after the playback device plays the first audio content, a first speech instruction input by the user into the playback device, wherein a second intent or second slot information in the first speech instruction is incomplete;

determining, based on the first intent and the first slot information stored in the context, the second intent and the second slot information that correspond to the first speech instruction; and instructing, based on the second intent and the second slot information, the playback device to play second audio content.

2. The method of claim 1, wherein determining, based on the identifier of the first audio content, the first intent and the first slot information that correspond to the first non-speech instruction comprises:

extracting, based on the identifier of the first audio content, the first intent from an intent field corresponding to the first audio content; and extracting, based on the identifier of the first audio content, the first slot information from a slot field corresponding to the first audio content.

3. The method of claim 1, wherein after determining, based on the first intent and the first slot information, the second intent and the second slot information that correspond to the first speech instruction, the method further comprises saving the second intent and the second slot information as the context.

4. The method of claim 1, further comprising saving the first intent and the first slot information as a second context when the first play message does not carry a preset identifier, wherein a priority of the second context is lower than a priority of the first context.

5. The method of claim 4, further comprising storing the first context and the second context, wherein determining, based on the intent and the slot information stored in the context, the second intent and the second slot information that correspond to the first speech instruction comprises:

determining, based on the intent and the slot information in the first context, the second intent and the second slot information that correspond to the first speech instruction when an effective duration of the second context is less than a first preset value; or determining, based on the intent and the slot information in the second context, the second intent and the second slot information that correspond to the first speech instruction when the effective duration of the second context is greater than a second preset value, wherein the second preset value is greater than or equal to the first preset value.

6. The method of claim 1, wherein the first speech instruction comprises the second slot information, and wherein the determining, based on the first intent and the first slot information, the second intent and the second slot information that correspond to the first speech instruction, further comprises determining that the second intent is the same as the first intent when the first intent is a preset inheritable intent.

7. The method of claim 1, wherein the first speech instruction comprises the second intent, and wherein the determining, based on the first intent and the first slot information, the second intent and the second slot information that correspond to the first speech instruction comprises determining that the second slot information is the same as the first slot information when the first slot information is preset inheritable slot information.

8. The method of claim 1, wherein the instructing, based on the second intent and the second slot information, the playback device to play second audio content comprises sending a second play instruction to the playback device, wherein the second play instruction comprises an audio resource of the second audio content corresponding to the second intent and the second slot information.

9. The method of claim 1, wherein the first non-speech instruction comprises a non-speech instruction input by the user into the playback device, an instruction for the playback device to automatically switch audio content, a non-speech instruction input by the user into another electronic device, or an instruction for another electronic device to automatically switch audio content in the playback device.

10. A server, comprising:

a processor; and a memory wherein the memory stores instructions that when executed by the processor, cause the server:

receive a first play message, wherein the first play message comprises an identifier of first audio content, and wherein the first play message is generated in response to a first non-speech instruction input by a user into a playback device;

determine based on the identifier of the first audio content, a first intent and first slot information that correspond to the first non-speech instruction;

store the first intent and the first slot information as a context when the first play message carries a preset identifier;

instruct in response to the first play message, the playback device to play the first audio content;

receive after playing the first audio content, a first speech instruction input by the user into the playback device, wherein a second intent or second slot information in the first speech instruction is incomplete;

determine based on the first intent and the first slot information stored in the context, the second intent and the second slot information that correspond to the first speech instruction; and instruct based on the second intent and the second slot information, the playback device to play second audio content.

11. The server of claim 10, wherein the server determining, based on the identifier of the first audio content, the first intent and the first slot information that correspond to the first non-speech instruction further comprises:

extracting, based on the identifier of the first audio content, the first intent from an intent field corresponding to the first audio content; and extracting, based on the identifier of the first audio content, the first slot information from a slot field corresponding to the first audio content.

12. The server of claim 10, wherein after the server determines, based on the first intent and the first slot information, the second intent and the second slot information that correspond to the first speech instruction, and wherein the server is further configured to save the second intent and the second slot information as the context.

13. The server of claim 10, wherein the server saving the first intent and the first slot information as a context further comprises saving the first intent and the first slot information as a second context when the first play message does not carry a preset identifier, wherein a priority of the second context is lower than a priority of the first context.

14. The server of claim 13, wherein the server stores the first context and the second context, and wherein the server determining, based on the intent and the slot information stored in the context, the second intent and the second slot information that correspond to the first speech instruction further comprises:

determining, based on the intent and the slot information in the first context, the second intent and the second slot information that correspond to the first speech instruction when an effective duration of the second context is less than a first preset value; or determining, based on the intent and the slot information in the second context, the second intent and the second slot information that correspond to the first speech instruction when an effective duration of the second context is greater than a second preset value, wherein the second preset value is greater than or equal to the first preset value.

15. The server of claim 10, wherein the first speech instruction comprises the second slot information, and wherein the server determining, based on the first intent and the first slot information, the second intent and the second slot information that correspond to the first speech instruction further comprises determining that the second intent is the same as the first intent when the first intent is a preset inheritable intent.

16. The server of claim 10, wherein the first speech instruction comprises the second intent, and wherein the server determining, based on the first intent and the first slot information, the second intent and the second slot information that correspond to the first speech instruction further comprises determining that the second slot information is the same as the first slot information when the first slot information is preset inheritable slot information.

17. The server of claim 10, wherein the server instructing, based on the second intent and the second slot information, the playback device to play the second audio content further comprises sending a second play instruction to the playback device, wherein the second play instruction comprises an audio resource of the second audio content corresponding to the second intent and the second slot information.

18. A speech interaction system comprising:
a playback device; and
a server, wherein the server is configured to:
receive a first play message, wherein the first play message comprises an identifier of first audio content, and wherein the first play message is generated in response to a first non-speech instruction input by a user into the playback device;
determine, based on the identifier of the first audio content, a first intent and first slot information that correspond to the first non-speech instruction;
store the first intent and the first slot information as a context when the first play message carries a preset identifier;
instruct, in response to the first play message, the playback device to play the first audio content;
after playing the first audio content, receive a first speech instruction input by the user into the playback device, wherein a second intent or second slot information in the first speech instruction is incomplete;
determine, based on the first intent and the first slot information stored in the context, the second intent and the second slot information that correspond to the first speech instruction; and
instruct, based on the second intent and the second slot information, the playback device to play second audio content.

19. The speech interaction system of claim 18, wherein the server is further configured to, after determining, based on the first intent and the first slot information, the second intent and the second slot information that correspond to the first speech instruction, save the second intent and the second slot information as the context.

20. The speech interaction system of claim 18, wherein the server is further configured to save the first intent and the first slot information as a second context when the first play message does not carry a preset identifier, and wherein a priority of the second context is lower than a priority of the first context.

* * * * *